(12) United States Patent
Morino et al.

(10) Patent No.: US 11,613,425 B2
(45) Date of Patent: Mar. 28, 2023

(54) BAG BUNDLE CONVEYANCE APPARATUS AND BAG BUNDLE CONVEYANCE METHOD

(71) Applicant: PACRAFT Co., Ltd., Tokyo (JP)

(72) Inventors: Manabu Morino, Iwakuni (JP); Kazuo Fukunaga, Iwakuni (JP); Takayuki Utsunomiya, Iwakuni (JP)

(73) Assignee: PACRAFT CO., LTD., Tokyo (JP)

( * ) Notice: Subject to any disclaimer, the term of this patent is extended or adjusted under 35 U.S.C. 154(b) by 0 days.

(21) Appl. No.: 17/494,046

(22) Filed: Oct. 5, 2021

(65) Prior Publication Data
US 2022/0106126 A1    Apr. 7, 2022

(30) Foreign Application Priority Data
Oct. 7, 2020 (JP) ............................. JP2020-169781

(51) Int. Cl.
| | | |
|---|---|---|
| B65G 15/58 | (2006.01) | |
| B65G 23/00 | (2006.01) | |
| B65G 15/22 | (2006.01) | |
| B65G 15/12 | (2006.01) | |
| B65G 47/32 | (2006.01) | |

(52) U.S. Cl.
CPC ............. *B65G 15/58* (2013.01); *B65G 15/12* (2013.01); *B65G 15/22* (2013.01); *B65G 23/00* (2013.01); *B65G 47/32* (2013.01); *B65G 2201/0238* (2013.01)

(58) Field of Classification Search
CPC ........ B65G 15/58; B65G 15/22; B65G 23/00; B65G 2201/0238; B65G 17/485; B65G 15/12; B65G 15/20; B65G 47/32
USPC ................... 198/419.3, 418.9, 426, 429, 430
See application file for complete search history.

(56) References Cited

U.S. PATENT DOCUMENTS

| | | | | |
|---|---|---|---|---|
| 3,902,587 A | * | 9/1975 | Checcucci ............. | B65G 47/32 198/465.1 |
| 4,552,261 A | * | 11/1985 | Raudat ................. | B65G 47/088 198/419.3 |
| 4,768,642 A | * | 9/1988 | Hunter ................. | B65G 47/082 198/429 |
| 5,127,209 A | * | 7/1992 | Hunter ................... | B65H 33/16 53/529 |
| 5,460,481 A | * | 10/1995 | Prakken ................. | B65G 57/32 414/798.2 |
| 5,605,031 A | * | 2/1997 | Prakken ............... | B65G 47/918 53/538 |
| 5,778,640 A | * | 7/1998 | Prakken ................. | B65B 5/061 53/538 |

(Continued)

FOREIGN PATENT DOCUMENTS

JP    2019-210116 A    12/2019

*Primary Examiner* — Mark A Deuble
(74) *Attorney, Agent, or Firm* — Pillsbury Winthrop Shaw Pittman, LLP

(57) ABSTRACT

A bag bundle conveyance apparatus which conveys a bag bundle including a plurality of bags, includes: a support body which supports the bag bundle from below; a holding unit which holds the bag bundle; and a transfer drive unit which moves the holding unit in a conveyance direction, wherein the transfer drive unit moves the holding unit in the conveyance direction in a state where the bag bundle is supported from below by the support body and is held by the holding unit, in such a manner that the bag bundle is conveyed in the conveyance direction.

18 Claims, 16 Drawing Sheets

(56) References Cited

U.S. PATENT DOCUMENTS

| | | | | |
|---|---|---|---|---|
| 5,893,701 | A * | 4/1999 | Pruett | B65G 47/32 414/798.2 |
| 6,691,856 | B1 * | 2/2004 | Prakken | B65G 47/082 198/419.3 |
| 6,755,606 | B2 * | 6/2004 | Luebben | B65G 47/841 198/456 |
| 7,665,598 | B2 * | 2/2010 | Begin | B65G 47/082 198/459.8 |
| 8,113,335 | B2 * | 2/2012 | Aronsson | B65G 47/841 198/740 |
| 2016/0362259 | A1 * | 12/2016 | Papsdorf | B65B 35/36 |

* cited by examiner

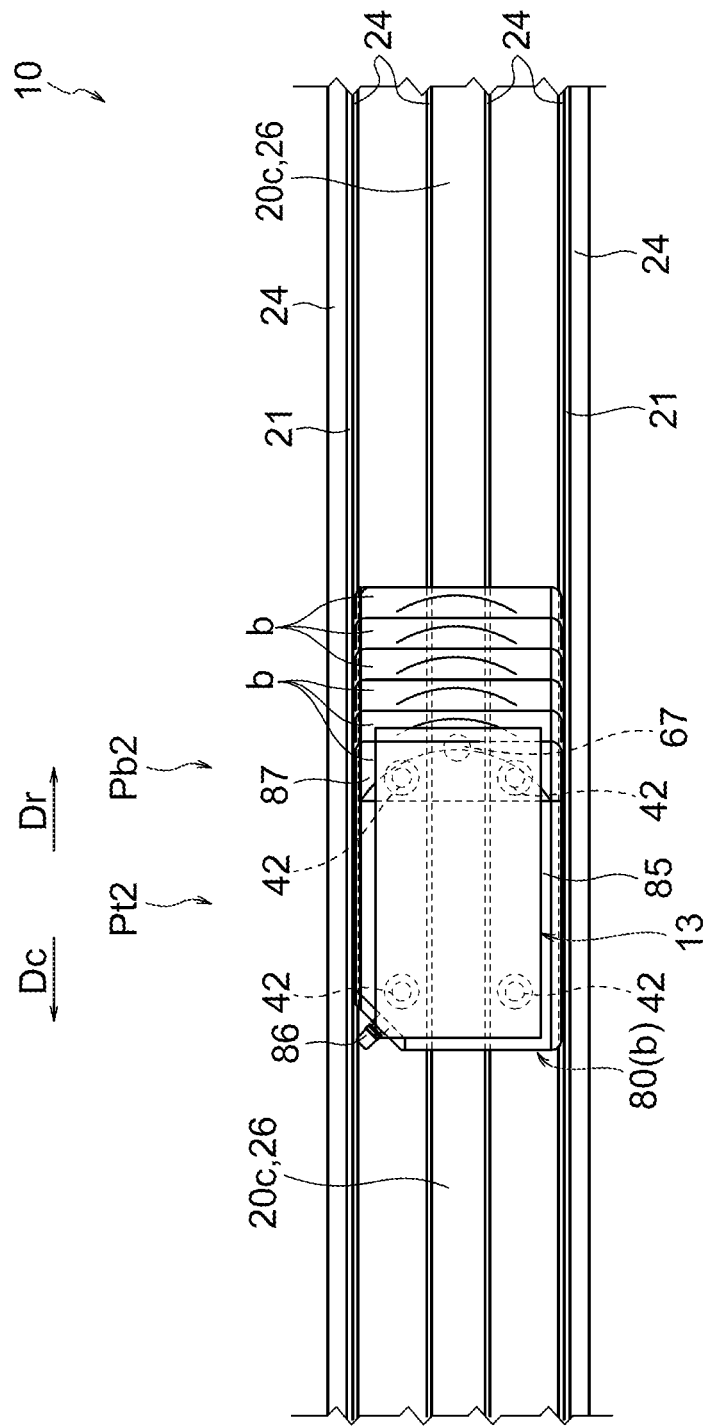

ical Field

The present disclosure is directed to a bag bundle conveyance apparatus and a bag bundle conveyance method.

BACKGROUND ART

As a method of conveying a bag bundle containing a plurality of bags being stacked, a method in which a conveyance belt on which a bag bundle is placed is caused to travel to convey the bag bundle to a desired position together with the conveyance belt is known.

Also, an apparatus in which a holding unit holds and lifts the whole of a bag bundle and then conveys the bag bundle to a desired position is known (see Japanese patent application publication No. 2019-210116).

SUMMARY OF INVENTION

In a method using a conveyance belt, the posture of a bag bundle is not stable on the conveyance belt and the posture of a bag bundle may be greatly collapsed under the influence of inertia during the conveyance, so that a plurality of bags included in one bag bundle may separate into two or more bundles. In particular, when each bag locally has a larger thickness like a bag with a spout, it is not easy to stably stack a plurality of bags and thus the posture of a bag bundle tends to collapse on the conveyance belt.

In addition, in a method in which the whole of a bag bundle is conveyed while being supported and lifted, the posture of the bag bundle (in particular, a part of the bag bundle which is not directly held by a holding unit) may change significantly under the influence of gravity when the bag bundle is lifted. Thus, in a case where only a part of a bag bundle is directly held (in particular, in a case where only a narrow range of a bag bundle is directly held), some bags included in the bag bundle may unintentionally bend when the bag bundle is put on a placement location.

The present disclosure has been contrived in view of the above circumstances, and an object of the present disclosure is to provide an advantageous technique for conveying a bag bundle while suppressing the collapse of the posture of the bag bundle and preventing bending of each bag.

Solution to Problem

One aspect of the present disclosure is directed to a bag bundle conveyance apparatus which conveys a bag bundle including a plurality of bags, the bag bundle conveyance apparatus comprising: a support body which supports the bag bundle from below; a holding unit which holds the bag bundle; and a transfer drive unit which moves the holding unit in a conveyance direction, wherein the transfer drive unit moves the holding unit in the conveyance direction in a state where the bag bundle is supported from below by the support body and is held by the holding unit, in such a manner that the bag bundle is conveyed in the conveyance direction.

The support body may support the bag bundle from below while exposing a part of a lower surface of the bag bundle, and the holding unit may nip and hold the bag bundle while being in contact with the part of the lower surface of the bag bundle exposed from the support body.

The plurality of bags of the bag bundle supported by the support body may be displaced in the conveyance direction in such a manner that each of the plurality of bags partially overlaps with an adjacent bag, the support body may have an extension space extending in the conveyance direction, and the holding unit may travel through the extension space while conveying the bag bundle in the conveyance direction.

The bag bundle conveyance apparatus may comprise a conveyance drive unit which causes the support body to move in the conveyance direction, wherein the conveyance drive unit and the transfer drive unit may move the support body and the holding unit together in the conveyance direction in a state where the bag bundle is supported by the support body from below and held by the holding unit, in such a manner that the bag bundle is conveyed in the conveyance direction.

The support body may include a conveyance belt, the bag bundle may be supported from below by being placed on the conveyance belt, and the conveyance drive unit may cause the conveyance belt to travel in the conveyance direction.

The support body may include a plurality of conveyance belts, the bag bundle may be supported from below by being placed on the plurality of conveyance belts, the conveyance drive unit may cause the plurality of conveyance belts to travel in the conveyance direction, the extension space may be provided between two conveyance belts positioned adjacently of the plurality of conveyance belts.

Each of the plurality of bags may include a thick portion which has a locally larger thickness in each of the plurality of bags, and the bag bundle may be supported by the support body in a state where the thick portion of at least one of the plurality of bags is in contact with the support body.

Another aspect of the present disclosure is directed to a bag bundle conveyance method which conveys a bag bundle including a plurality of bags, the bag bundle conveyance method comprising the steps of: causing a support body to support the bag bundle from below; causing a holding unit to hold the bag bundle; and causing the holding unit to move in a conveyance direction in a state where the bag bundle is supported from below by the support body and is held by the holding unit in such a manner that the bag bundle is conveyed in the conveyance direction.

According to the present disclosure, a bag bundle can be advantageously conveyed while suppressing the collapse of the posture of the bag bundle and preventing bending of each bag.

BRIEF DESCRIPTION OF DRAWINGS

FIG. 16 is a plan view showing an operation example of a bag bundle conveyance apparatus.

DESCRIPTION OF EMBODIMENTS

Figure 1:
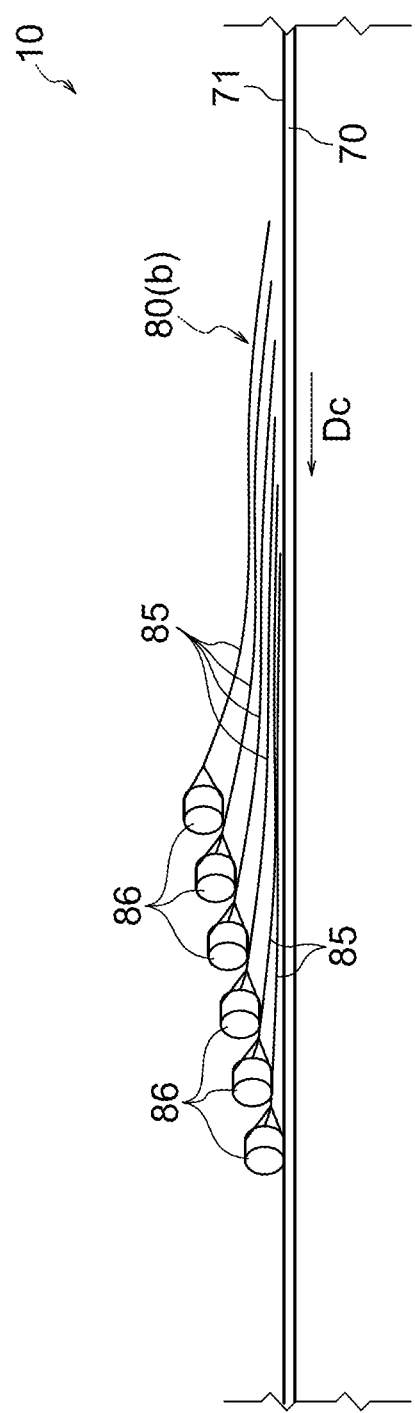
FIG. 1 is a diagram illustrating an example of a bag bundle conveyance apparatus which conveys a bag bundle in a conveyance direction in a state where the bag bundle is placed on a support body.

FIG. 1 is a diagram showing an example of a bag bundle conveyance apparatus 10 which conveys a bag bundle 80 in a conveyance direction Dc in a state where the bag bundle 80 is placed on a support body 70.

In the example shown in FIG. 1, a bag bundle 80 is placed on the upper surface (that is, the conveyance surface 71) of the support body 70. Each of a plurality of bags b included in a bag bundle 80 includes: a main body portion 85 which is flexible and has a nearly uniform thickness; and a thick portion 86 which is attached to the main body portion 85 and has a larger thickness than the main body portion 85.

Each thick portion 86 shown in FIG. 1 is formed by a spout but each thick portion 86 may be formed by an element other than the spout. The thick portion 86 may be made of the same material as the main body portion 85 and may be formed as a part of the main body portion 85. For example, a portion in which a sheet-shaped member is folded and a plurality of layers of the sheet-shaped member are superimposed, like the bottom portion of a self-standing bag, may form the thick portion 86.

In each bag b, a range of the thick portion 86 is narrower than a range of the main body portion 85, and the thick portion 86 has a locally larger thickness in each bag b. A plurality of bags b included in a bag bundle 80 are stacked in the height direction while being slightly shifted in a horizontal direction (in the present example, a conveyance direction Dc) in such a manner that the thick portions 86 are not stacked on each other. As a result, it is intended to reduce the size of a bag bundle 80 in the height direction and to stabilize the posture of the bag bundle 80.

In this case, a gap is formed between adjacent bags b (for example, in the vicinity of thick portions 86), it is not possible that the main body portions 85 of adjacent bags b come into contact with each other over the entire range, and thus the degree of the close contact between adjacent bags b is limited. Further, due to the thick portion 86 of each bag b, a gap is formed between each bag b and the conveyance surface 71, and the degree of the close contact of each bag b with the conveyance surface 71 is also limited. As described above, the bag bundle 80 shown in FIG. 1 is inherently in a state in which the posture is liable to collapse.

Further, in the bag bundle 80 shown in FIG. 1, the end positions of the respective bags b are displaced in a horizontal direction, and only the bag b at the uppermost position constitutes the rearmost end (that is, the right end in FIG. 1) of the bag bundle 80. Therefore, when the bag bundle 80 is pushed from the rearmost end side for conveying the bag bundle 80, the pressing force acts directly on only one bag b (that is, the bag b arranged at the uppermost position), so that the bag b is easily bent.

Figure 2:
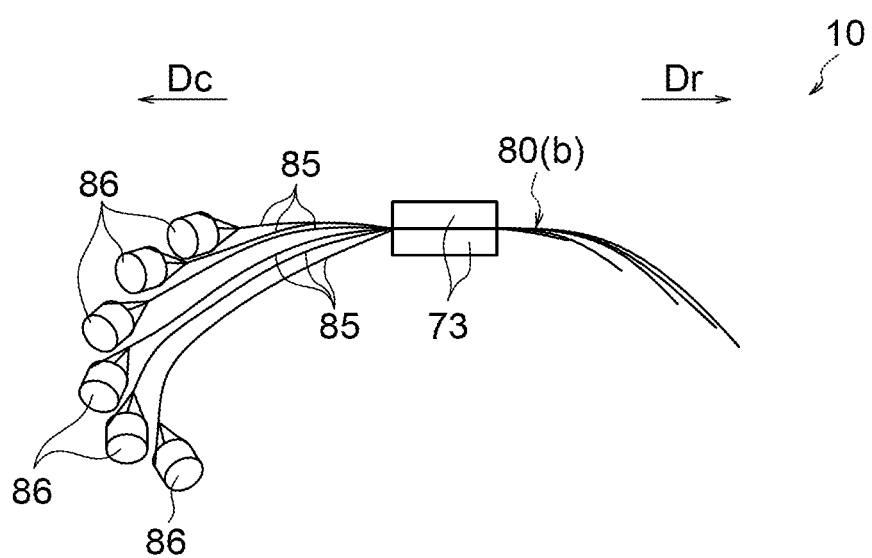
FIG. 2 is a diagram showing an example in which a bag bundle is conveyed in a conveyance direction in a state where the bag bundle is lifted by a pair of conveyance holding bodies.

FIG. 2 is a diagram showing an example in which a bag bundle 80 is conveyed in a conveyance direction Dc in a state where the bag bundle 80 is lifted by a pair of conveyance holding bodies 73.

In the example shown in FIG. 2, an entire bag bundle 80 is lifted by the conveyance holding bodies 73 in a state where the main body portions 85 of all the bags b included in the bag bundle 80 are partially nipped by the conveyance holding bodies 73. Therefore, the portions of the bag bundle 80 which are not directly supported by the conveyance holding bodies 73 (for example, the conveyance direction Dc side end portion and the retracting direction Dr side end portion of the bag bundle 80) hang down under the influence of gravity, and as a result, the posture of the bag bundle 80 changes. In particular, the bag b at the lowermost position is greatly and easily bent, and when the bag bundle 80 is placed on a mounting place, the bag b at the lowermost position tends to be unintentionally bent.

In order to suppress the change in the posture of a bag bundle 80 when the bag bundle 80 is lifted, large conveyance holding bodies 73 may be used to directly support a wide range of each bag b (for example, the main body portion 85). However, it may be disadvantageous in terms of handleability of the conveyance holding bodies 73 due to the large size of the conveyance holding bodies 73. For example, when the conveyance holding bodies 73 separates from a bag bundle 80 and retracts in the retracting direction Dr, due to the increases in the size of the conveyance holding bodies 73 in the direction along the retracting direction Dr (for example, in a horizontal direction), the retracting distance required for the conveyance holding bodies 73 to completely separate from the bag bundle 80 may also become longer. Further, as the size of the conveyance holding bodies 73 in the direction along the retracting direction Dr increases, the size (in particular, the size in the retracting direction Dr) of the retracting area to be secured for the conveyance holding bodies 73 also increases.

When the retracting direction Dr for the conveyance holding bodies 73 is different from the longitudinal direction of a bag bundle 80, it is possible to prevent the retracting distance for the conveyance holding bodies 73 from increasing. However, in a case where a member which guides conveyance of a bag bundle 80 (see a "conveyance guide 21" in FIG. 3 described later) is provided, the retracting direction Dr for the conveyance holding bodies 73 is limited and thus the conveyance holding bodies 73 may have no choice but to be caused to retract along the longitudinal direction of a bag bundle 80.

Figure 3:
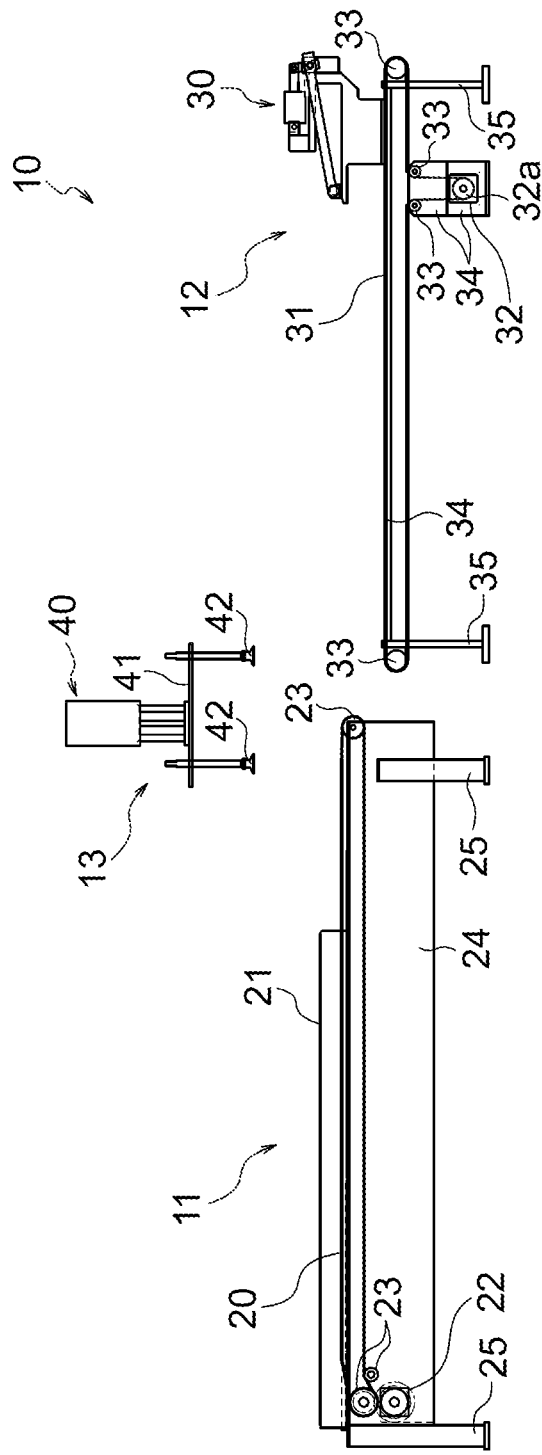
FIG. 3 is an exploded view of an example of a bag bundle conveyance apparatus and schematically shows an example of a conveyance unit, a holding transfer unit and a take-out unit included in the bag bundle conveyance apparatus.
Figure 4:
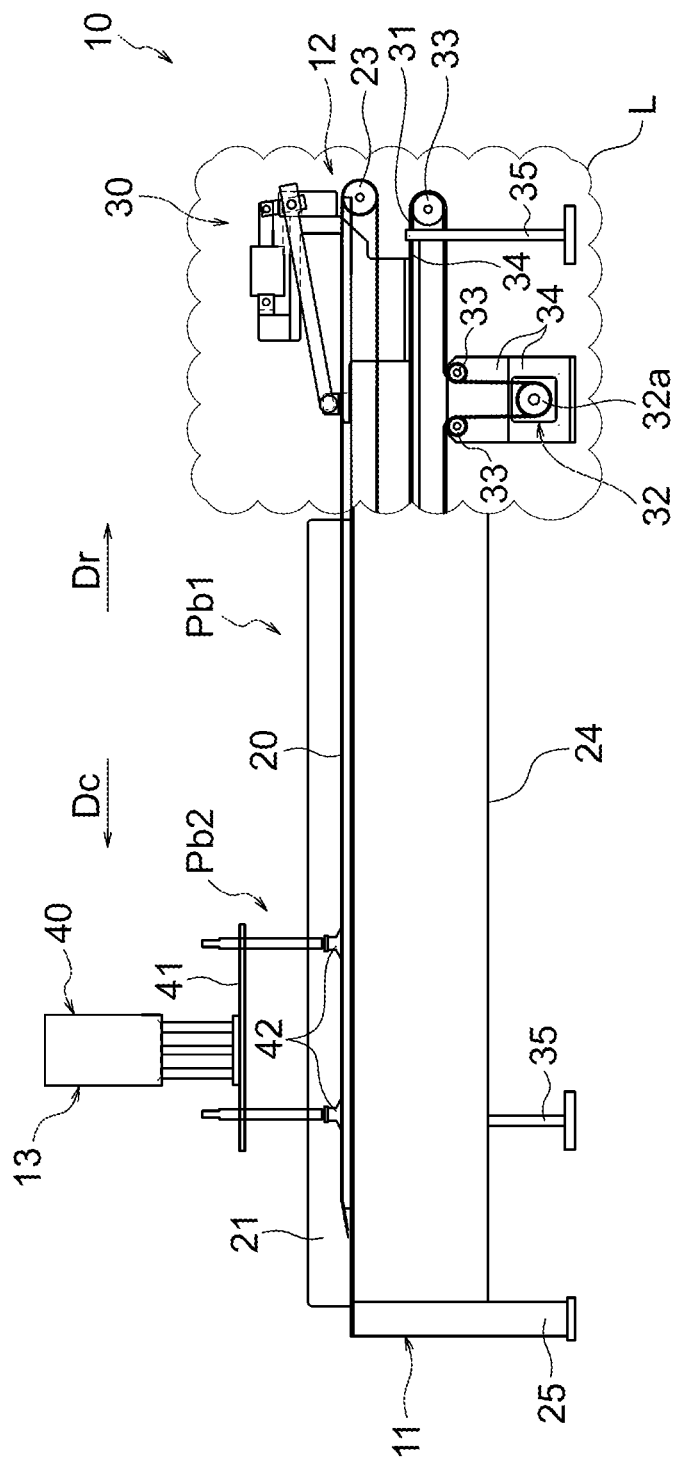
FIG. 4 is a diagram showing an outline of the overall configuration of the bag bundle conveyance apparatus shown in FIG. 3 and shows a state in which a conveyance unit, a holding transfer unit and a take-out unit are integrally combined.

FIG. 3 is an exploded view of an example of the bag bundle conveyance apparatus 10, schematically showing an example of the conveyance unit 11, the holding transfer unit 12 and the take-out unit 13 included in the bag bundle conveyance apparatus 10. In FIG. 3, of the conveyance unit 11, a conveyance frame 24 located on the front side of the paper surface is not shown and indicates the inside state of the conveyance frame 24. FIG. 4 is a diagram showing an outline of the overall configuration of the bag bundle conveyance apparatus 10 shown in FIG. 3 and shows a state in which the conveyance unit 11, the holding transfer unit 12 and the take-out unit 13 are integrally combined. In FIG. 4, in the range indicated by the reference sign of "L", the conveyance frame 24 is not shown to indicate the state inside the conveyance frame 24 while in the other range, the conveyance frame 24 is shown.

In the bag bundle conveyance apparatus 10 shown in FIGS. 3 and 4, the conveyance unit 11 and the holding transfer unit 12 cooperate to convey a bag bundle from a preparation position Pb1 to a take-out position Pb2. Then, the take-out unit 13 takes out each bag from a bag bundle positioned at the take-out position Pb2 and moves each bag from the take-out position Pb2 to a later stage (not shown) to deliver each bag to the later stage. The take-out unit 13 repeatedly conveys a bag from the take-out position Pb2 to the later stage and consequently carries all the bags included in a bag bundle positioned at the take-out position Pb2 to the later stage.

The conveyance unit 11 includes: an endless conveyance belt 20 (i.e., a support body) for supporting a bag bundle from below; and a plurality of conveyance guide rollers 23 on which the conveyance belt 20 is supported. At least any one or more of the plurality of conveyance guide rollers 23 (in the example shown in FIG. 3, the conveyance guide roller 23 at the leftmost position) receives rotational power transmitted from a conveyance drive device 22 (for example, a motor) to actively rotate. The conveyance belt 20 travels in response to the active rotation of the conveyance guide roller 23.

The method of transmitting the rotational power from the conveyance drive device 22 to the conveyance guide roller 23 is not limited. For example, the rotational power may be transmitted from the conveyance drive device 22 to the conveyance guide roller 23 via a pulley and a belt, or the rotational power may be transmitted from the conveyance drive device 22 to the conveyance guide roller 23 via gears.

As described above, in the example shown in FIGS. 3 and 4, the combination of the conveyance drive device 22 and the conveyance guide rollers 23 mainly acts as a conveyance drive unit which causes the conveyance belt 20 (i.e., a support body) to travel in the conveyance direction Dc.

The conveyance drive device 22 and the conveyance guide rollers 23 are supported by the conveyance frame 24, and each conveyance guide roller 23 is rotatably attached to the conveyance frame 24. The conveyance frame 24 is fixedly installed on an installation surface (for example, a floor) via a plurality of conveyance legs 25.

The portion of the conveyance belt 20 which is exposed upward and forms a surface on which a bag bundle 80 is to be placed (that is, an "upper exposed surface") extends, above the upper surface of the conveyance frame 24, along this upper surface. In the example shown in FIGS. 3 and 4, the portion of the conveyance belt 20 which forms the upper exposed surface is in slidable contact with the conveyance frame 24 (in particular, the upper surface). Specifically, the portion of the conveyance belt 20 which forms the upper exposed surface travels while sliding on the conveyance frame 24 in both the state where the downward load is not applied to that portion and the state where the downward load is applied to that portion. In this way, the conveyance frame 24 acts as a belt support member which supports the conveyance belt 20 from below, and prevents the conveyance belt 20 (in particular, the portion forming the upper exposed surface) from bending downward. The portion of the conveyance belt 20 which forms the upper exposed surface does not have to come into contact with the conveyance frame 24 (in particular, the upper surface) in a state where no downward load is applied to that portion. In this case, the portion of the conveyance belt 20 which forms the upper exposed surface, in a state where a downward load is applied to that portion, may bend downward and come into contact with the conveyance frame 24 (in particular, the upper surface) to be slidable supported from below by the conveyance frame 24. For example, by adjusting the height direction position of the conveyance guide rollers 23, the conveyance belt 20 can be slid on the conveyance frame 24 or can be caused to travel at a position away from the conveyance frame 24.

The conveyance frame 24 supports a conveyance guide 21 extending along the conveyance belt 20 (in particular, a lateral portion of the portion forming the upward exposed surface). In the example shown in FIGS. 3 and 4, one of two conveyance guides 21 (specifically, the conveyance guide 21 located on the front side of the paper surface) is not shown. The two conveyance guides 21 are provided in such a manner that the conveyance belt 20 is sandwiched between the two conveyance guides 21 and are present at least in a range from the preparation position Pb1 to the take-out position Pb2. When a bag bundle 80 is conveyed from the preparation position Pb1 to the take-out position Pb2, the bag bundle 80 is laterally guided in the conveyance direction Dc by the two conveyance guides 21.

The holding transfer unit 12 includes: a holding unit 30 (i.e., a holding device) for holding a bag bundle; and a transfer drive unit which moves the holding unit 30 in the conveyance direction Dc and the retracting direction Dr. In the present embodiment, the conveyance direction Dc and the retracting direction Dr are horizontal directions and opposite directions to each other. Therefore, the holding unit 30 is reciprocated on a straight track by the transfer drive unit.

The holding transfer unit 12 shown in FIGS. 3 and 4 includes: an endless transfer belt 31; a plurality of transfer guide rollers 33 on which the transfer belt 31 is supported; and a transfer drive device 32 (for example, a motor) which transmits power to the transfer belt 31 to cause the transfer belt 31 to travel. The transfer belt 31 is supported not only on the plurality of transfer guide rollers 33 but also on a roller (that is, a drive roller) 32a included in the transfer drive device 32. By directly transmitting power from the drive roller 32a to the transfer belt 31, the transfer belt 31 (in particular, the portion forming the upper exposed surface) travels in the conveyance direction Dc and the retracting direction Dr.

The transfer drive device 32 and the transfer guide rollers 33 are supported by the holding transfer frame 34, and each transfer guide roller 33 is rotatably attached to the holding transfer frame 34. In FIGS. 3 and 4, the holding transfer frame which supports two transfer guide rollers 33 which support the portion of the transfer belt 31 which forms the upper exposed surface is not shown. Other two transfer guide rollers 33 provided at positions close to the drive roller 32a are supported by a holding transfer frame 34 which has a vertically elongated block shape and is provided on the installation surface. The transfer drive device 32 (including the drive roller 32a) is supported by another holding transfer frame 34 which has a block shape and is attached to the vertically elongated holding transfer frame 34.

The portion of the transfer belt 31 which forms the upper exposed surface extends, above the upper surface of the holding transfer frame 34, along this upper surface. In the example shown in FIGS. 3 and 4, the portion of the transfer belt 31 which forms the upper exposed surface is in slidable contact with the holding transfer frame 34 (in particular, the upper surface). Specifically, the portion of the transfer belt 31 which forms the upper exposed surface travels while sliding on the holding transfer frame 34 both in a state where the downward load is not applied to that portion and in a state where the downward load is applied to that portion. In this way, the holding transfer frame 34 acts as a belt support member that supports the transfer belt 31 from below to prevent the transfer belt 31 (in particular, the portion forming the upper exposed surface) from bending downward. The portion of the transfer belt 31 which forms the upper exposed surface does not have to come into contact with the holding transfer frame 34 (in particular, the upper surface) in a state where no downward load is applied to that portion. In this case, the portion of the transfer belt 31 which forms the upper exposed surface may bend downward and come into contact with the holding transfer frame 34 (in particular, the upper surface) to be slidably supported from below by the holding transfer frame 34 in a state where a downward load is applied to that portion. For example, by adjusting the height direction position of the transfer guide rollers 33, the transfer belt 31 can be slid on the holding transfer frame 34 or can be caused to travel at a position away from the holding transfer frame 34.

The holding transfer frame 34 that supports the transfer belt 31 from below is fixedly installed on the installation surface (for example, a floor) via a plurality of holding transfer legs 35. The holding transfer frame (specifically, the holding transfer frame which supports the two transfer guide rollers 33 which support the portion of the transfer belt 31 which forms the upper exposed surface) which is not shown in FIGS. 3 and 4 may be provided integrally with, or may be provided as a separate body from the holding transfer frame 34 shown in FIGS. 3 and 4, and, for example, may be supported by the holding transfer legs 35.

The holding unit 30 is fixedly attached to the transfer belt 31 (in particular, the portion forming the upper exposed surface) and moves in a horizontal direction (in particular, the conveyance direction Dc and the retracting direction Dr) as the transfer belt 31 travels. A specific structural example of the holding unit 30 will be described later (see FIGS. 5 to 8).

As described above, in the example shown in FIGS. 3 and 4, the combination of the transfer belt 31, the transfer drive device 32 and the transfer guide rollers 33 mainly serves as the transfer drive unit which causes the holding unit 30 (i.e., a holding device) to move in the conveyance direction Dc.

The take-out unit 13 includes a take-out drive device 40, a take-out frame 41, and a plurality of take-out holding bodies 42.

The take-out drive device 40 is a device that moves the take-out frame 41 (and thus a plurality of take-out holding bodies 42) in the height direction, and includes, for example, an air cylinder. Each take-out holding body 42 is supported by the take-out frame 41 and moves together with the take-out frame 41. Each take-out holding body 42 is configured to be able to hold each bag included in a bag bundle and, for example, includes a suction cup which is able to stick to a side wall surface (for example, an exposed surface of the main body portion 85 (see FIGS. 1 and 2)) of each bag by pressing the suction cup against the side wall surface.

The take-out drive device 40 moves the take-out frame 41 and the plurality of take-out holding bodies 42 downward to bring the plurality of take-out holding bodies 42 into contact with a bag put on the conveyance belt 20, so that the bag is held by the plurality of take-out holding bodies 42. As described above, the take-out drive device 40 is a device which causes the take-out unit 13 (in particular, the plurality of take-out holding bodies 42) to execute the operation of holding a bag.

Next, a structural example of the holding unit 30 will be described. The holding unit 30 (see FIGS. 5 to 8) described below is only an example and the holding unit 30 may be configured by another mechanism.

Figure 5:
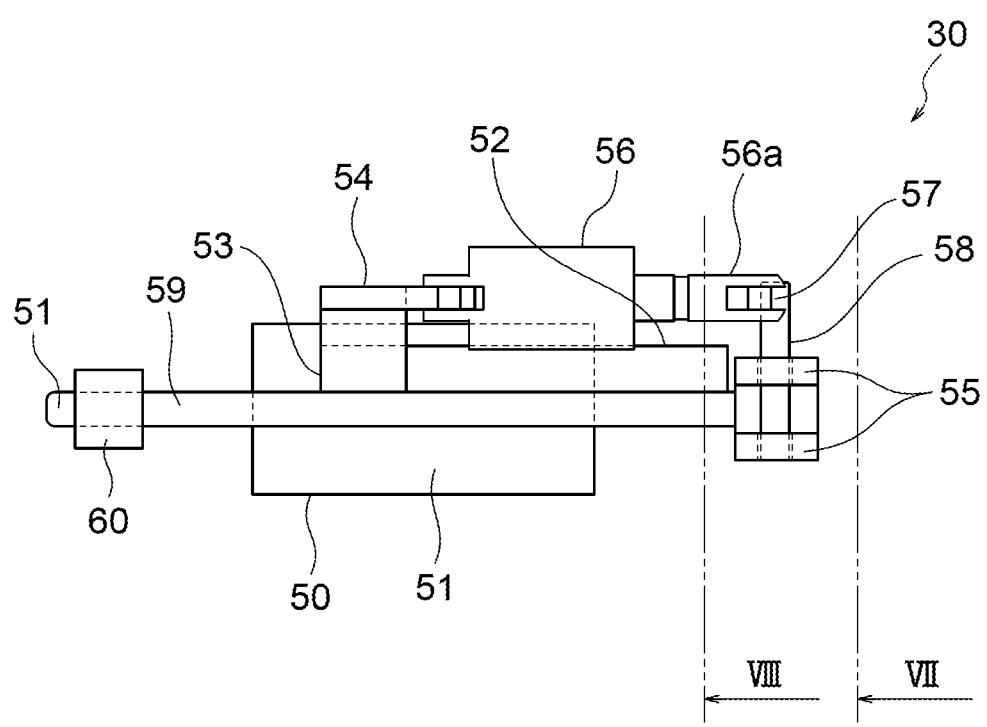
FIG. 5 is a plan view showing an example of a holding unit.
Figure 6:
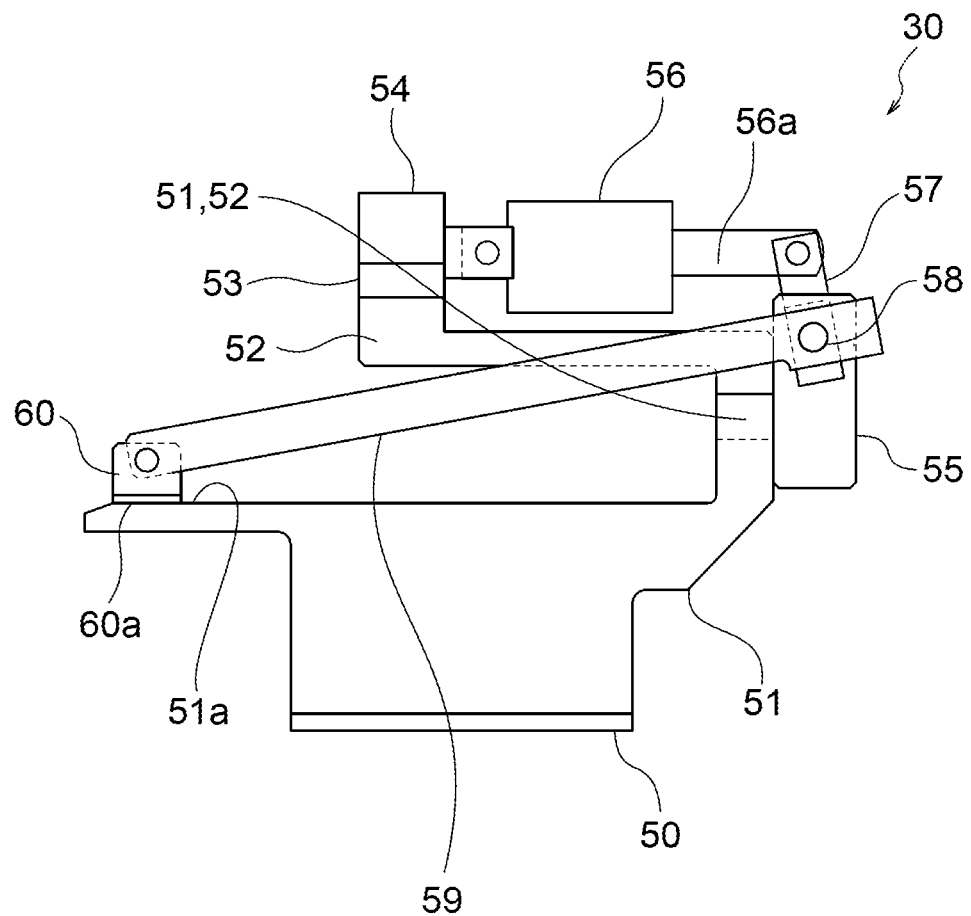
FIG. 6 is a side view of the holding unit shown in FIG. 5.
Figure 7:
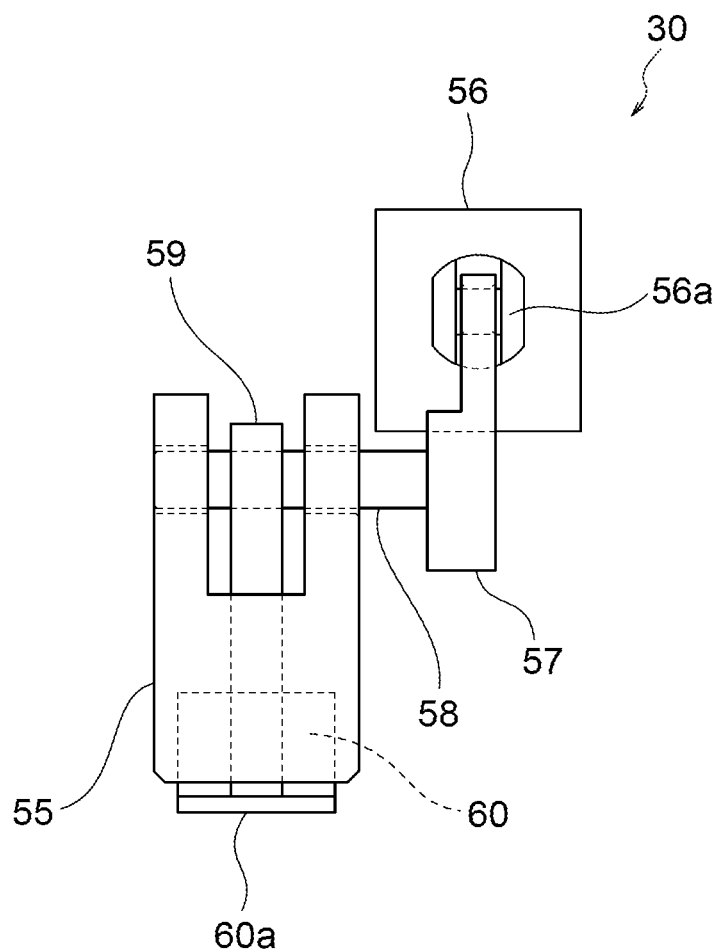
FIG. 7 is a side view of the holding unit with reference to the position of the chain double-dashed line indicated by an arrow denoted by a reference numeral of "VII" in FIG. 5.
Figure 8:
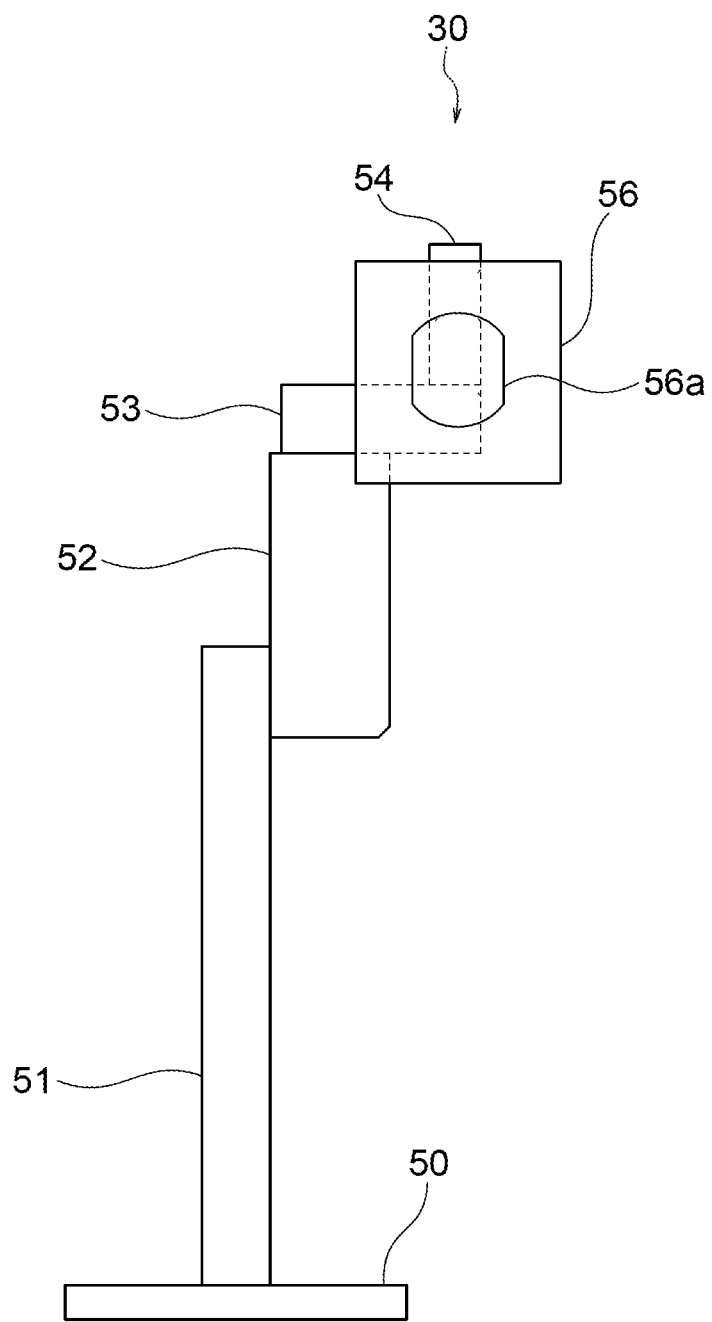
FIG. 8 is a side view of the holding unit with reference to the position of the chain double-dashed line indicated by an arrow denoted by a reference numeral of "VIII" in FIG. 5.

FIG. 5 is a plan view showing an example of the holding unit 30. FIG. 6 is a side view of the holding unit 30 shown in FIG. 5. FIG. 7 is a side view of the holding unit 30 with reference to the position of the chain double-dashed line indicated by an arrow of reference numeral "VII" in FIG. 5. In FIG. 7, however, the first holding member 51 and the second holding member 52 are not shown. FIG. 8 is a side view of the holding unit 30 with reference to the position of the chain double-dashed line indicated by an arrow of reference numeral "VIII" in FIG. 5. In FIG. 8, however, the movable lever 59 and the movable bag bundle holding body 60 are not shown.

The holding unit 30 shown in FIGS. 5 to 8 includes: a holding base portion 50 which is fixed to (for example, is engaged with) the transfer belt 31 (see FIG. 3); a first holding member 51 which is fixedly attached to the holding base portion 50; a second holding member 52 fixed to the first holding member 51; a third holding member 53 fixed to the second holding member 52; a fourth holding member 54 fixed to the third holding member 53; and a fifth holding member 55 fixed to the first holding member 51. The holding base portion 50 and the first holding member 51 to the fifth holding member 55 in the present example are formed by different members from each other. However, two or more members of the holding base portion 50 and the first holding member 51 to the fifth holding member 55 may be formed by a single body (specifically, a member having a single type of composition).

A holding drive device 56 is attached to the fourth holding member 54. The holding drive device 56 has a reciprocating shaft 56a capable of advancing and retreating in a horizontal direction. One end of the holding drive lever 57 is rotatably attached to the tip of the reciprocating shaft 56a. A rotation shaft 58 is fixed to the other end of the holding drive lever 57. The rotation shaft 58 is rotatably supported by the fifth holding member 55, and one end of the movable lever 59 is fixed to the rotation shaft 58. A movable bag bundle holding body 60 is rotatably attached to the other end of the movable lever 59. Preferably, the movable bag bundle holding body 60 has the center of mass such that a first holding surface portion 60a basically faces in a downward direction (specifically, in a direction directed to the first holding member 51 (in particular, a second holding surface portion 51a)) regardless of the swing of the movable lever 59 about the rotation shaft 58.

In the holding unit 30 having the above-described configuration, the first holding member 51 and the movable bag bundle holding body 60 form a gripping unit that grips a bag bundle from above and below. Specifically, a bag bundle is held while being nipped from above and below in a state where the upper surface of the first holding member 51 (in particular, the second holding surface portion 51*a* which includes the range facing the first holding surface portion 60*a* of the movable bag bundle holding body 60 and extends in the horizontal direction) is in contact with the lower surface of the bag bundle and the first holding surface portion 60*a* is in contact with the upper surface of the bag bundle.

The gripping unit (in particular, the movable bag bundle holding body 60) performs open-close movement according to the protruding state of the reciprocating shaft 56*a*, Specifically, the holding drive lever 57 swings around the rotation shaft 58 according to the advancing/retreating operation of the reciprocating shaft 56*a* from the main body of the holding drive device 56, and the rotation shaft 58 rotates according to the swinging of the holding drive lever 57. The movable lever 59 swings around the rotation shaft 58 according to the rotation of the rotation shaft 58, and the movable bag bundle holding body 60 moves according to the swinging of the movable lever 59. As the amount of protrusion of the reciprocating shaft 56*a* from the main body of the holding drive device 56 becomes smaller, the movable bag bundle holding body 60 moves downward to approach the first holding member 51 and is placed in a closed state. On the other hand, as the amount of protrusion of the reciprocating shaft 56*a* from the main body of the holding drive device 56 increases, the movable bag bundle holding body 60 moves upward to move away from the first holding member 51 and is placed in an open state.

By placing the first holding member 51 and the movable bag bundle holding body 60 in a closed state, a bag bundle located between the first holding member 51 and the movable bag bundle holding body 60 is gripped. On the other hand, by placing the first holding member 51 and the movable bag bundle holding body 60 in an open state, a bag bundle located between the first holding member 51 and the movable bag bundle holding body 60 is released from gripping.

Figure 9:
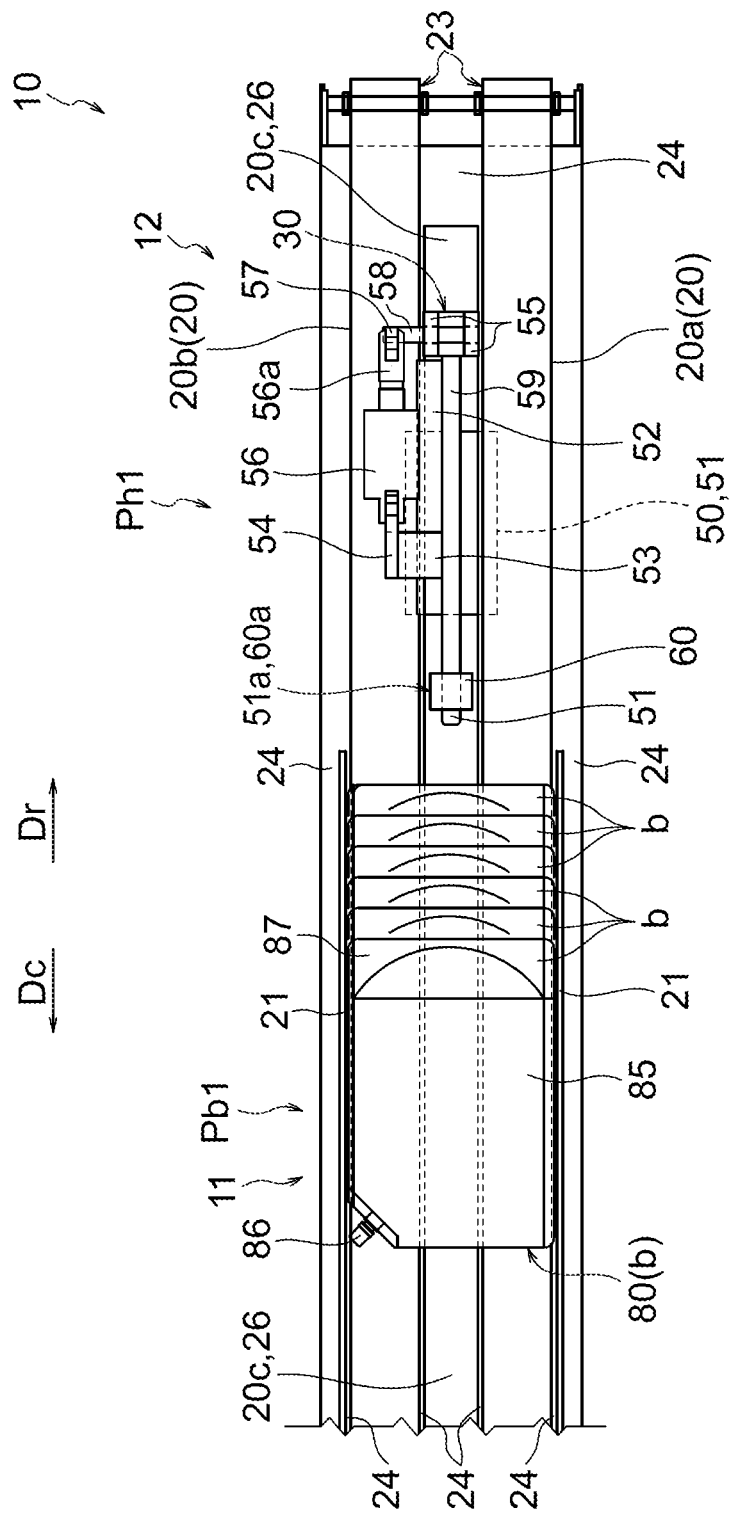
FIG. 9 is a plan view showing a part of the bag bundle conveyance apparatus shown in FIG. 4 which includes an extent indicated by a reference sign of "L" in FIG. 4.

FIG. 9 is a plan view showing a part of the bag bundle conveyance apparatus 10 shown in FIG. 4 including the range indicated by the reference sign of "L" in FIG. 4. FIG. 9 shows the holding unit 30 arranged at a retracting position Ph1 and also shows the first holding member 51 and the movable bag bundle holding body 60 which are placed in a closed state as an example. Further, FIG. 9 shows a bag bundle 80 positioned at the preparation position Pb1.

In the example shown in FIG. 9, the bag bundle conveyance apparatus 10 includes a plurality of conveyance belts 20 (specifically, the first conveyance belt 20*a* and the second conveyance belt 20*b*) as a support body on which a bag bundle 80 is placed. By placing a bag bundle 80 (in particular, both end parts in the horizontal direction forming a right angle to the conveyance direction Dc) on the upper exposed surfaces of the first conveyance belt 20*a* and the second conveyance belt 20*b*, the bag bundle 80 is supported from below.

Each of the first conveyance belt 20*a* and the second conveyance belt 20*b* extends in the conveyance direction Dc and the retracting direction Dr. The power output from the conveyance drive device 22 (see FIG. 3) is transmitted to both the first conveyance belt 20*a* and the second conveyance belt 20*b* via one or more conveyance guide rollers 23, so that both the first conveyance belt 20*a* and the second conveyance belt 20*b* (in particular, the portions forming the upper exposed surfaces) are caused to run in the conveyance direction Dc.

The conveyance belt 20 of the present embodiment includes an extension space 20*c* extending in the conveyance direction Dc. Specifically, the first conveyance belt 20*a* and the second conveyance belt 20*b* are located adjacent to each other at separate positions from each other in the horizontal direction (that is, the up-down direction in FIG. 9) forming a right angle to each of the conveyance direction Dc and the retracting direction Dr. Therefore, the extension space 20*c* extending in the conveyance direction Dc is provided between the first conveyance belt 20*a* and the second conveyance belt 20*b*.

A part of the lower surface of a bag bundle 80 placed on the first conveyance belt 20*a* and the second conveyance belt 20*b* is exposed through the extension space 20*c*. As described above, the conveyance belt 20 (i.e., the first conveyance belt 20*a* and the second conveyance belt 20*b*) shown in FIG. 9 supports a bag bundle 80 from below while exposing a part of the lower surface of the bag bundle 80. The holding unit 30 (in particular, the second holding surface portion 51*a*) nips and holds a bag bundle 80 while being in contact with the portion of the bag bundle 80 exposed from the conveyance belt 20 (that is, the portion exposed via the extension space 20*c*).

The upper surface of the conveyance frame 24 has a frame hole 26 extending in the conveyance direction Dc. The frame hole 26 is provided at a place facing the extension space 20*c* in the height direction. As will be described later, while a bag bundle 80 put on the first conveyance belt 20*a* and the second conveyance belt 20*b* is conveyed in the conveyance direction Dc, the holding unit 30 travels through the extension space 20*c* and the frame hole 26 to move in the conveyance direction Dc and the retracting direction Dr.

The second holding surface portion 51*a* of the first holding member 51 of the holding unit 30 is located at the same height position as or at a slightly higher position than or at a slightly lower position than the upper exposed surfaces of the respective first conveyance belt 20*a* and the second conveyance belt 20*b*. Specifically, the second holding surface portion 51*a* is provided at a height position which enables to maintain a state where the first conveyance belt 20*a* and the second conveyance belt 20*b* support (specifically, are in contact with) a bag bundle 80 from below while the bag bundle 80 is being gripped by the first holding member 51 and the movable bag bundle holding body 60 placed in a closed state.

As will be described later, by moving the holding unit 30 from the retracting position Ph1 in the conveyance direction Dc, the second holding surface portion 51*a* advances to a space below a bag bundle 80 located on the conveyance belt 20 (in particular, at the preparation position Pb1). At least the leading end part of the second holding surface portion 51*a* in the conveyance direction Dc is preferably lower than the upper exposed surfaces of the respective first conveyance belt 20*a* and second conveyance belt 20*b* in such a manner that the second holding surface portion 51*a* can smoothly advance to a space below the bag bundle 80.

On the other hand, the first holding surface portion 60*a* of the movable bag bundle holding body 60 is provided to be movable above each of the first conveyance belt 20*a* and the second conveyance belt 20*b* along with the movable lever 59 (see FIGS. 5 and 6). The movable bag bundle holding body 60 may be movable in such a manner that the first holding surface portion 60a is arranged below the upper exposed surfaces of the respective first conveyance belt 20a and second conveyance belt 20b.

Figure 10:
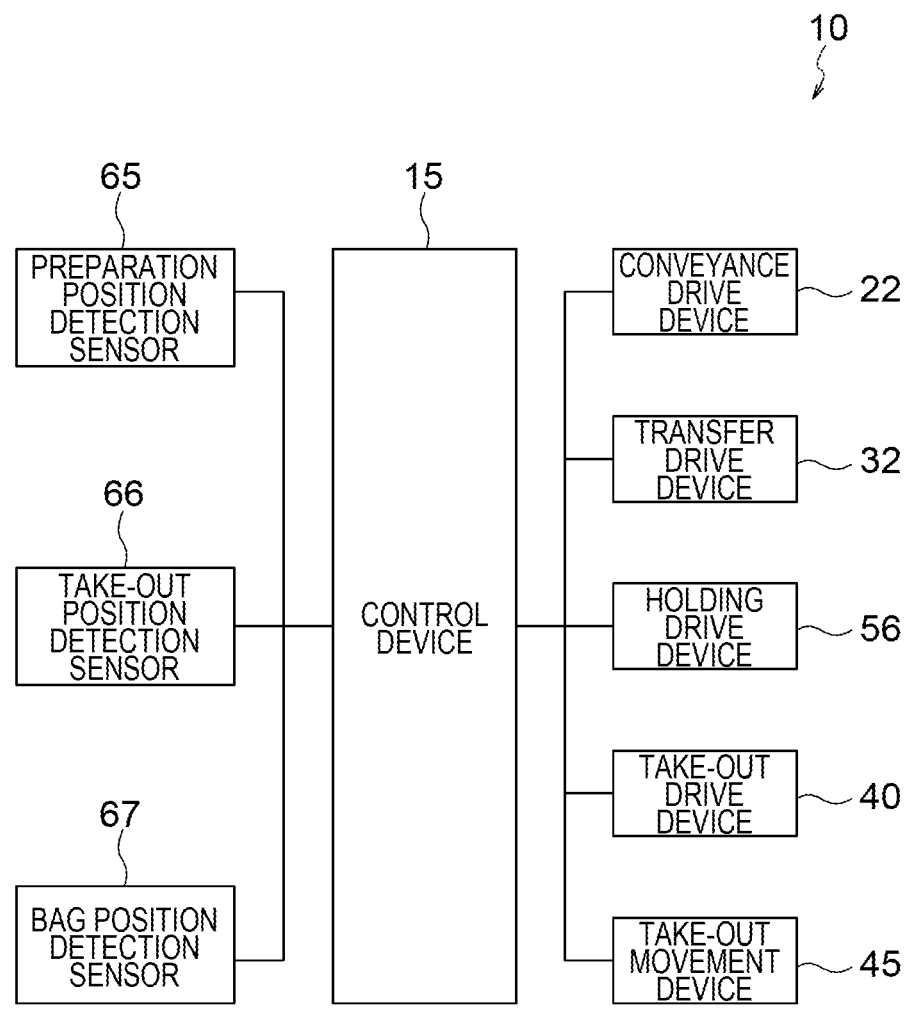
FIG. 10 is a block diagram showing an example of a control configuration of a bag bundle conveyance apparatus.

FIG. 10 is a block diagram showing an example of a control configuration of the bag bundle conveyance apparatus 10.

The bag bundle conveyance apparatus 10 includes a control device 15 and various devices included in the bag bundle conveyance apparatus 10 are controlled by the control device 15. The control device 15 is configured by appropriately combining arbitrary hardware (for example, an arithmetic processing unit and a memory) and arbitrary software. The control device 15 may be formed by a single device or a combination of a plurality of devices.

The control device 15 of the present embodiment is connected to, for example, the conveyance drive device 22, the transfer drive device 32, the holding drive device 56, the take-out drive device 40, a take-out movement device 45, a preparation position detection sensor 65, a take-out position detection sensor 66, and a bag position detection sensor 67.

The conveyance drive device 22 turns on and off the power output under the control of the control device 15 to cause the conveyance belt 20 to travel and stop. The transfer drive device 32 turns on and off the power output under the control of the control device 15 to cause the transfer belt 31 to travel and stop. The holding drive device 56 adjusts the amount of protrusion of the reciprocating shaft 56a under the control of the control device 15 to open and close the gripping unit (that is, the first holding member 51 and the movable bag bundle holding body 60). The take-out drive device 40 moves the take-out frame 41 and the take-out holding bodies 42 under the control of the control device 15 to cause the take-out unit 13 (in particular, the take-out holding bodies 42) to perform a bag holding operation.

The take-out movement device 45 is a device that moves the take-out unit 13 (that is, the take-out drive device 40, the take-out frame 41 and the take-out holding bodies 42) in an integrated fashion under the control of the control device 15. The take-out movement device 45 may have any structure and may include, for example, a motor and/or an air cylinder or any mechanism such as a link mechanism or a robot. The movement directions of the take-out drive device 40, the take-out frame 41, and the take-out holding bodies 42 by the take-out movement device 45 are not limited, but the movement directions include at least a component of the conveyance direction Dc and a component of the retracting direction Dr.

The preparation position detection sensor 65 is a sensor that detects the presence or absence of a bag bundle 80 or a bag b at the preparation position Pb1 (see FIGS. 4 and 9), and transmits the detection results to the control device 15. The take-out position detection sensor 66 is a sensor that detects the presence or absence of a bag bundle 80 or a bag b at the take-out position Pb2 (see FIG. 4), which is the transport destination of a bag bundle 80 (that is, each bag b), and transmits the detection results to the control device 15.

For example, the preparation position detection sensor 65 may adopt a range including a virtual line extending in the height direction as a detection range. It is preferable that this virtual line be determined in such a manner that all the bags b included in a bag bundle 80 are present on the virtual line immediately after the bag bundle 80 is arranged in the preparation position Pb1. Typically, a range of a bag bundle 80 arranged in the preparation position Pb1 which includes at least a part of the portion held directly by the holding unit 30 (in particular, the first holding member 51 and the movable bag bundle holding body 60) and extends in the height direction may be the detection range by the preparation position detection sensor 65. Likewise, the take-out position detection sensor 66 may adopt a range including a virtual line extending in the height direction as a detection range. It is preferable that this virtual line be determined in such a manner that all the bags b included in a bag bundle 80 are present on the virtual line immediately after the bag bundle 80 is arranged in the take-out position Pb2. Typically, a range of a bag bundle 80 arranged in the take-out position Pb2 which includes at least a part of the portion held directly by the holding unit 30 (in particular, the first holding member 51 and the movable bag bundle holding body 60) and extends in the height direction may be the detection range by the take-out position detection sensor 66.

The bag position detection sensor 67 is a sensor that directly or indirectly detects the specific position of a bag b (in particular, a bag b to be taken out next) in the take-out position Pb2, and transmits the detection results to the control device 15. The bag position detection sensor 67 of the present embodiment is attached to the take-out frame 41 (see FIG. 15 described later) and moves together with each take-out holding body 42.

The preparation position detection sensor 65, the take-out position detection sensor 66, and the bag position detection sensor 67 may have any configuration and may be configured using, for example, an optical sensor.

The control device 15 controls various devices based on the detection results from the preparation position detection sensor 65, the take-out position detection sensor 66 and the bag position detection sensor 67. Further, the control device 15 may perform control based on the control information of various devices. For example, the control device 15 may acquire information regarding the traveling position of the conveyance belt 20 and the position of a bag bundle 80 on the conveyance belt 20 according to the control information of the conveyance drive device 22. Further, the control device 15 may acquire information regarding the traveling position of the transfer belt 31 and the position of the holding unit 30 according to the control information of the transfer drive device 32.

Next, an example of a bag bundle conveyance method of conveying a bag bundle 80 will be described.

The control device 15 appropriately controls various elements (including elements shown in FIG. 10 and elements not shown in FIG. 10) of the bag bundle conveyance apparatus 10 so that the bag bundle conveyance method described below is performed.

As described below as an instance, the bag bundle conveyance method of the present embodiment includes: a step of supporting a bag bundle 80 from below by the conveyance belt 20 (i.e., a support body); a step of holding the bag bundle 80 by the holding unit 30 (i.e., a holding device); and a step of causing the conveyance belt 20 and the holding unit 30 to move together in the conveyance direction Dc in a state where the bag bundle 80 is supported from below by the conveyance belt 20 and held by the holding unit 30.

FIGS. 11 to 16 are plan views showing an operation example of the bag bundle conveyance apparatus 10. In FIGS. 11 to 16, in order to facilitate understanding, the illustration of a part of the elements included in the bag bundle conveyance apparatus 10 (for example, a part of the elements included in the holding unit 30) is omitted.

Figure 11:
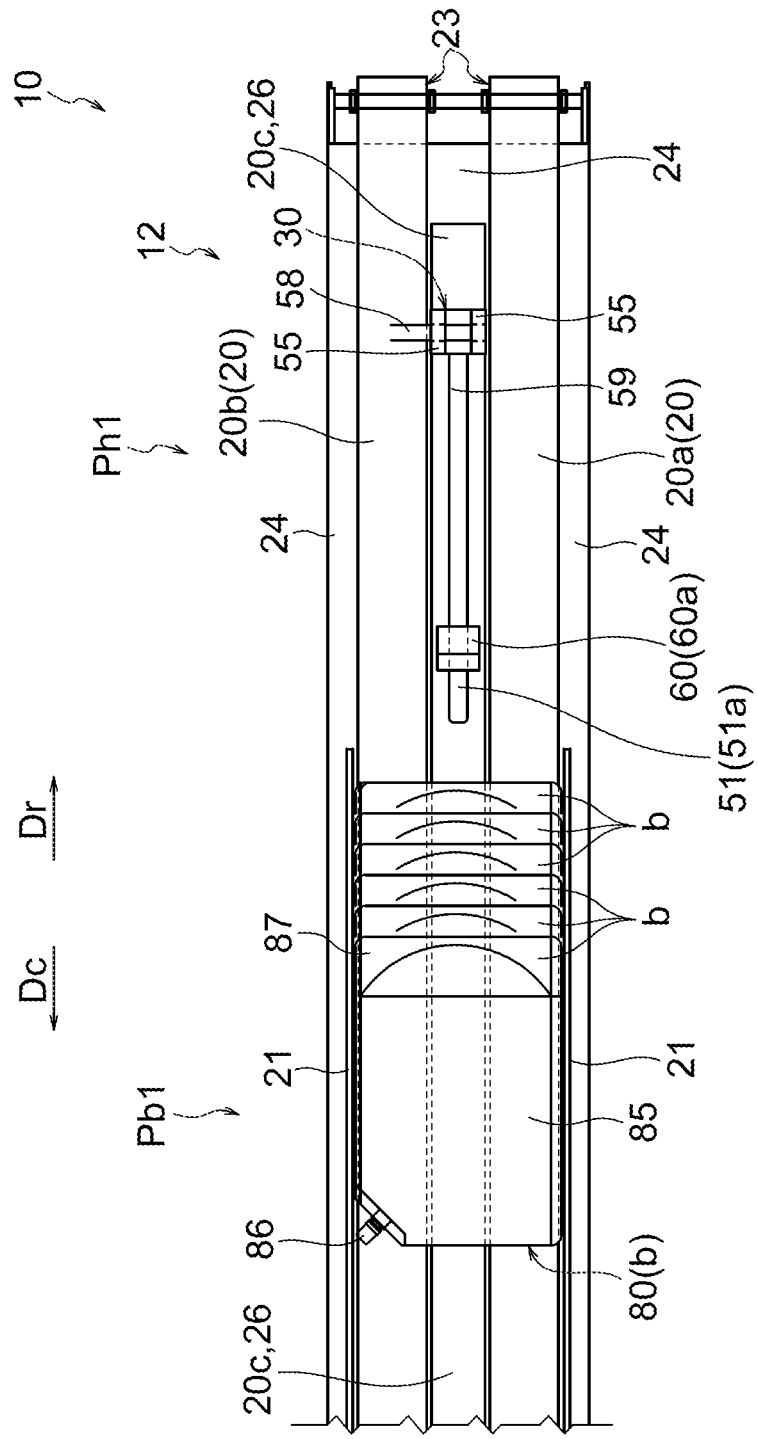
FIG. 11 is a plan view showing an operation example of a bag bundle conveyance apparatus.

As shown in FIG. 11, a bag bundle 80 is arranged on the first conveyance belt 20a and the second conveyance belt 20b at the preparation position Pb1 in a state where the holding unit 30 is positioned in the retracting position Ph1. The gripping unit shown in FIG. 11 (that is, the first holding member 51 and the movable bag bundle holding body 60) is placed in an open state. The retracting position Ph1 is a position opposite to the take-out position Pb2 (see FIGS. 4, 15 and 16) with respect to the preparation position Pb1. The holding unit 30 positioned in the retracting position Ph1 is located on the retracting direction Dr side with respect to the bag bundle 80 arranged at the preparation position Pb1 and does not come into contact with the bag bundle 80.

A bag bundle 80 may be supplied to the preparation position Pb1 by a machine (not shown) or manually. The supply of a bag bundle 80 to the preparation position Pb1 may be performed in a state where another bag bundle 80 (that is, one or more bags b) is placed in the take-out position Pb2. Therefore, a new bag bundle 80 may be supplied to the preparation position Pb1 while the take-out drive device 40 conveys each bag b from the take-out position Pb2 to a subsequent stage. Specifically, a new bag bundle 80 may be supplied to the preparation position Pb1 even while the take-out position detection sensor 66 is detecting that a bag b is placed in the take-out position Pb2.

In a bag bundle 80 supported by the conveyance belt 20 (i.e., the first conveyance belt 20a and the second conveyance belt 20b), a plurality of bags b are displaced in the conveyance direction Dc in such a manner that each bag b partially overlaps with an adjacent bag b. In the example shown in FIG. 11, the bag b at the uppermost position of the bag bundle 80 is placed in the most leading position with respect to the conveyance direction Dc, and the bag b at the lowermost position is placed in the rearmost position with respect to the conveyance direction Dc. The thick portion 86 of each bag b is positioned on the leading side in the conveyance direction Dc, and the main body portion 85 (in particular, the bottom portion 87) of each bag b is positioned on the rear side in the conveyance direction Dc.

In this way, a bag bundle 80 is supported by the conveyance belt 20 in a state where the thickness portion 86 of at least one of the plurality of bags b is in contact with the conveyance belt 20 (that is, in contact with at least one of the first conveyance belt 20a and the second conveyance belt 20b).

Figure 12:
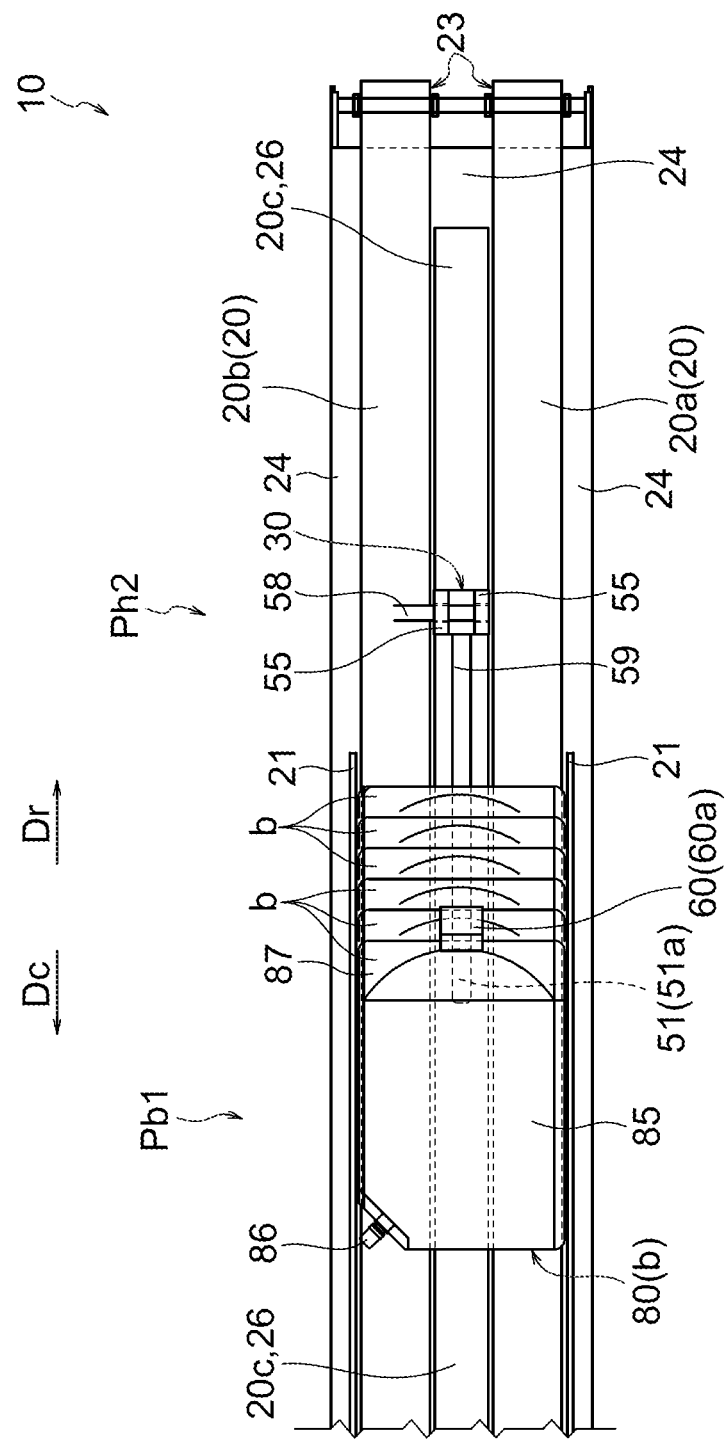
FIG. 12 is a plan view showing an operation example of a bag bundle conveyance apparatus.
Figure 13:
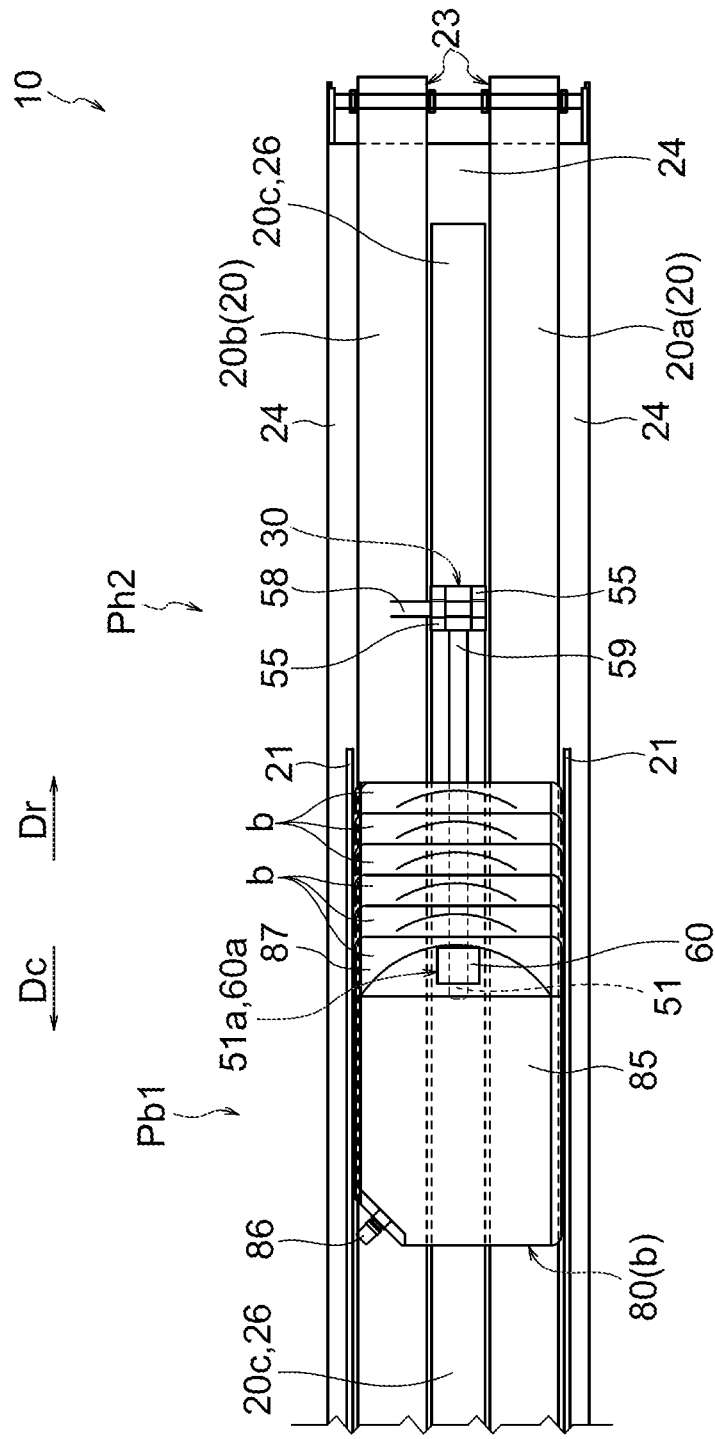
FIG. 13 is a plan view showing an operation example of a bag bundle conveyance apparatus.

After the preparation position detection sensor 65 (see FIG. 10) detects that a bag bundle 80 is arranged at the preparation position Pb1, the control device 15 controls the transfer drive device 32 (see FIG. 3) to move the holding unit 30 from the retracting position Ph1 (see FIG. 11) in the conveyance direction Dc and place the holding unit 30 in the holding position Ph2 (see FIG. 12).

While the holding unit 30 moves from the retracting position Ph1 to the holding position Ph2, the holding unit 30 travels through the extension space 20c and the frame hole 26. Further, while the holding unit 30 moves from the retracting position Ph1 to the holding position Ph2, the gripping unit (that is, the first holding member 51 and the movable bag bundle holding body 60) maintains an open state. As a result, the bag bundle 80 placed in the take-out position Pb2 is positioned between the second holding surface portion 51a of the first holding member 51 and the first holding surface portion 60a of the movable bag bundle holding body 60. By arranging the holding unit 30 at the holding position Ph2 in this way, the first holding surface portion 60a is positioned above the bag bundle 80 and the second holding surface portion 51a is positioned below the bag bundle 80.

Then, the control device 15 controls the holding drive device 56 (see FIGS. 5 to 9) in such a manner that the gripping unit (that is, the first holding member 51 and the movable bag bundle) is changed from an open state (see FIG. 12) to a closed state (see FIG. 13) while the holding unit 30 is arranged in the holding position Ph2. As a result, the bag bundle 80 positioned at the preparation position Pb1 is nipped and integrally held by the gripping unit placed in a closed state. In particular, in the present embodiment, all the bags b included in the bag bundle 80 are sandwiched by the gripping unit and the bag bundle 80 is firmly held by the gripping unit in such a manner that the relative positions between the bags b do not shift.

"The step of moving the holding unit 30 from the retracting position Ph1 to the holding position Ph2" and "the step of changing the gripping unit (that is, the first holding member 51 and the movable bag bundle holding body 60) from an open state to a closed state" described above may be performed while the take-out drive device 40 conveys each bag b from the take-out position Pb2 to a subsequent stage. In other words, even while the take-out position detection sensor 66 is detecting that a bag b is placed in the take-out position Pb2, "the step of moving the holding unit 30 from the retracting position Ph1 to the holding position Ph2" and "the step of changing the gripping unit from an open state to a closed state" may be performed.

Figure 14:
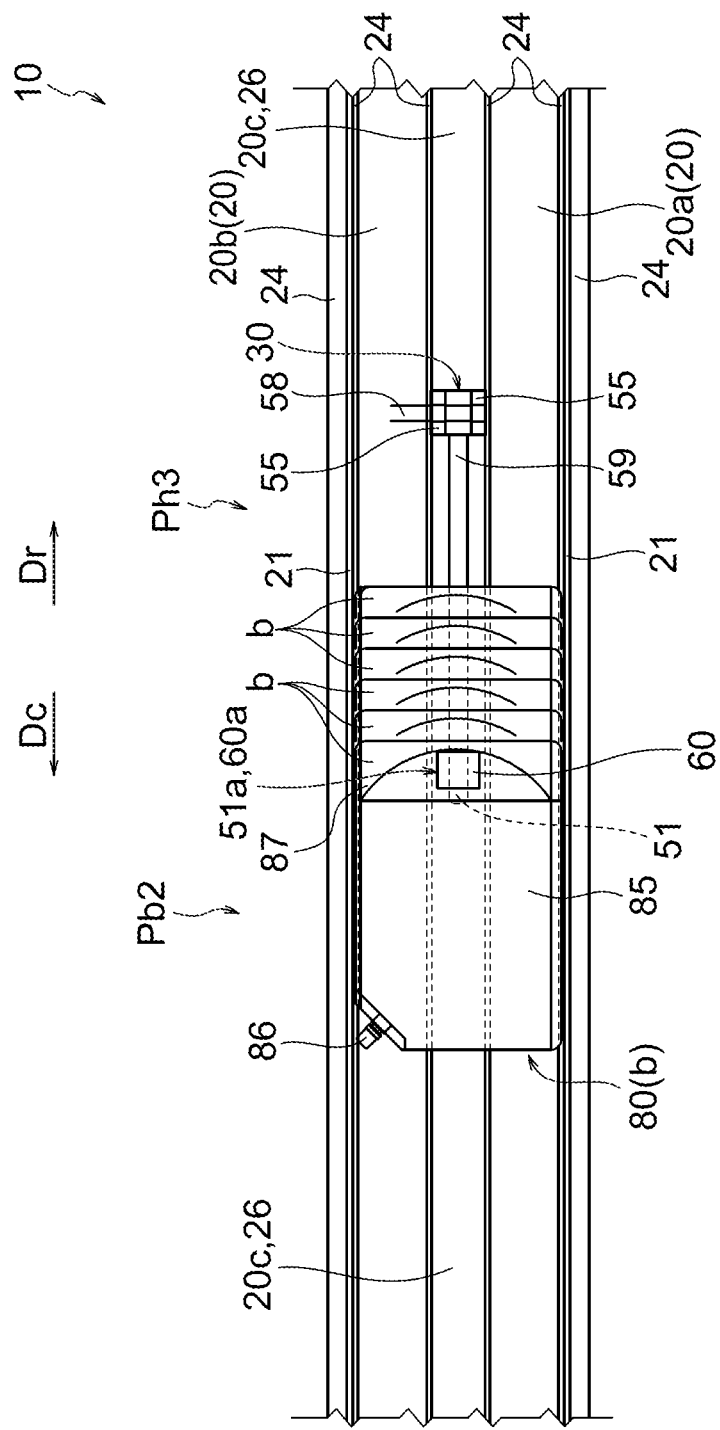
FIG. 14 is a plan view showing an operation example of a bag bundle conveyance apparatus.

Then, after the take-out position detection sensor 66 (see FIG. 10) detects that no bag b is placed in the take-out position Pb2, the control device 15 controls the conveyance drive device 22 and the transfer drive device 32 (see FIG. 3) in such a manner that the holding unit 30 is moved from the holding position Ph2 in the conveyance direction Dc and the bag bundle 80 is moved from the preparation position Pb1 in the conveyance direction Dc. As a result, as shown in FIG. 14, the holding unit 30 is arranged at a release position Ph3 while the bag bundle 80 is arranged at the take-out position Pb2. Specifically, the conveyance drive device 22 and the transfer drive device 32 move the first conveyance belt 20a, the second conveyance belt 20b and the holding unit 30 together in the conveyance direction Dc in a state where the bag bundle 80 is supported from below by the first conveyance belt 20a and the second conveyance belt 20b and is held by the holding unit 30 (in particular, by the gripping unit) in such a manner that the bag bundle 80 is conveyed in the conveyance direction Dc. As a result, the bag bundle 80 can be conveyed from the preparation position Pb1 to the take-out position Pb2 while the posture of the bag bundle 80 is prevented from collapsing and the bag bundle 80 is prevented from bending.

When a bag bundle 80 is conveyed from the preparation position Pb1 to the take-out position Pb2, the holding unit 30 preferably moves in the conveyance direction Dc at the same timing, at the same speed, and by the same distance as the conveyance belt 20 (i.e., the first conveyance belt 20a and the second conveyance belt 20b). This case is advantageous in transporting a bag bundle 80 in the conveyance direction Dc while suppressing the posture of the bag bundle 80 from collapsing and preventing each bag b from bending. Therefore, the control device 15 preferably controls the conveyance drive device 22 and the transfer drive device 32 (see FIG. 3) in such a manner that the portion of the first conveyance belt 20a forming the upper exposed surface, the portion of the second conveyance belt 20b forming the upper exposed surface, and the portion of the transfer belt 31 forming the upper exposed surface move in the conveyance direction Dc at the same timing, at the same speed and by the same distance.

After a bag bundle 80 is located at the take-out position Pb2, the control device 15 controls the holding drive device 56 (see FIGS. 5 to 9) to change the gripping unit (that is, the first holding member 51 and the movable bag bundle holding body 60) from a closed state to an open state. As a result, the bag bundle 80 located at the take-out position Pb2 is released from the holding of the holding unit 30 (i.e., the gripping unit).

After that, the control device 15 controls the transfer drive device 32 (see FIG. 3) in such a manner that the holding unit 30 moves from the release position Ph3 in the retracting direction Dr (see FIG. 15) and travels through the extension space 20c and the frame hole 26 to return to the retracting position Ph1 (see FIG. 11).

Figure 15:
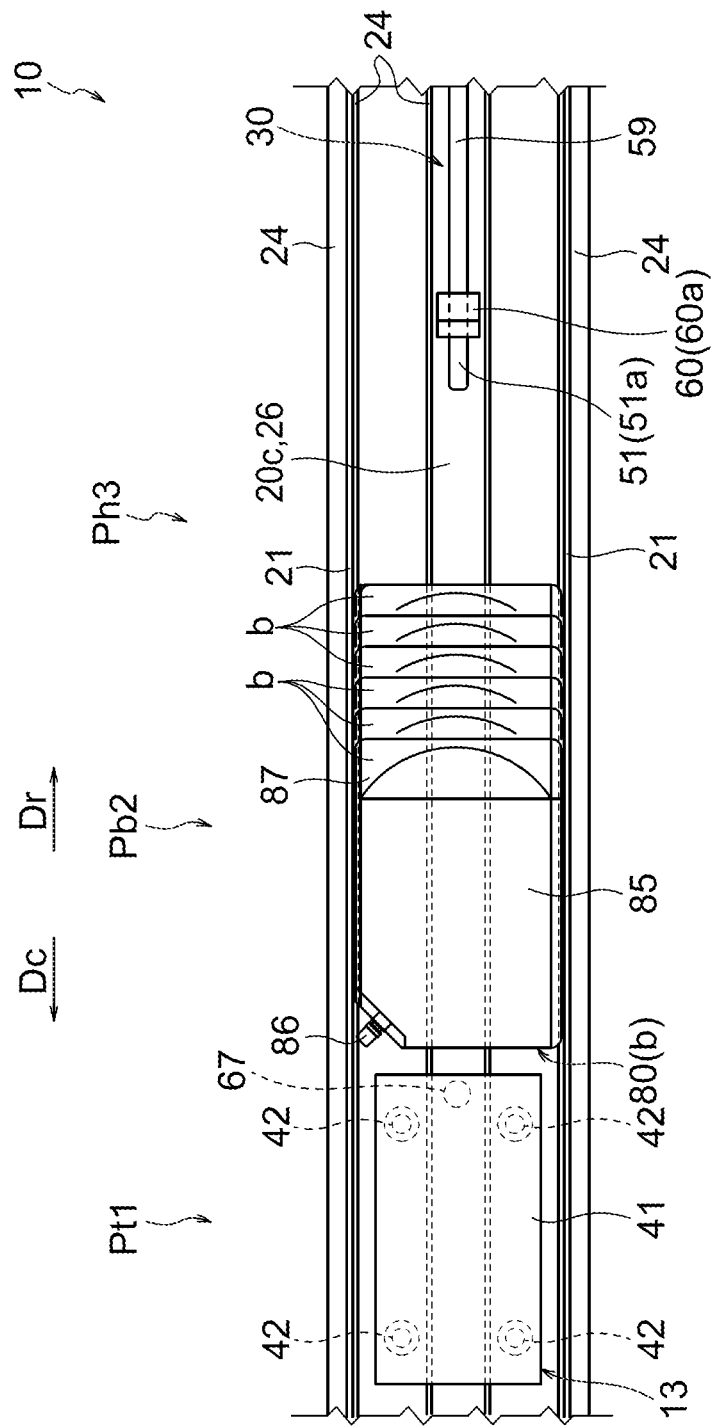
FIG. 15 is a plan view showing an operation example of a bag bundle conveyance apparatus.

On the other hand, the control device 15 controls the take-out movement device 45 (see FIG. 10) in such a manner that the take-out unit 13 is arranged at a take-out preparation position Pt1 (see FIG. 15). As a result, each take-out holding body 42 and the bag position detection sensor 67 of the take-out unit 13 are positioned on the conveyance direction Dc side with respect to the bag bundle 80 (that is, each bag b) placed in the take-out position Pb2 and are positioned on the upper side with respect to the bag bundle 80 placed in the take-out position Pb2. Therefore, each take-out holding body 42 and the bag position detection sensor 67 do not overlap in the height direction with the bag bundle 80 (that is, each bag b) placed in the take-out position Pb2.

Then, the control device 15 controls the take-out movement device 45 to move the take-out unit 13 from the take-out preparation position Pt1 in the retracting direction Dr and place the take-out unit 13 in a take-out start position Pt2 (see FIG. 16). As a result, the take-out unit 13 (that is, each take-out holding body 42 and the bag position detection sensor 67) is positioned above the bag bundle 80 placed in the take-out position Pb2 at a position away from the bag bundle 80. Then, in a state where the take-out unit 13 is placed in the take-out start position Pt2, the control device 15 controls the take-out drive device 40 (see FIG. 3) to move the take-out frame 41 and each take-out holding body 42 downward in such a manner that the bag b at the uppermost position placed in the take-out position Pb2 is held by each take-out holding body 42. The control device 15 controls the take-out movement device 45 to move the take-out unit 13 in a state where the bag b is held by each take-out holding body 42, in such a manner that the bag b is moved from the take-out position Pb2 to a subsequent stage (not shown).

When the take-out unit 13 is arranged in the take-out start position Pt2, the control device 15 controls the take-out movement device 45 based on a detection result of the bag position detection sensor 67. The bag position detection sensor 67 is a sensor that directly or indirectly detects the specific position of a bag b to be taken out next (in other words, a bag b at the uppermost position in the take-out position Pb2). The specific configuration and detection method of the bag position detection sensor 67 are not limited.

For example, the bag position detection sensor 67 may detect the leading position on the conveyance direction Dc side of a bag bundle 80 placed in the take-out position Pb2. In this case, the control device 15 may move the take-out unit 13 (in particular, each take-out holding body 42) from the detected leading position of the bag bundle 80 in the retracting direction Dr by a predetermined distance in such a manner that the take-out unit 13 is placed in the take-out start position Pt2. The "predetermined distance" referred to here is preferably determined according to the size in the retracting direction Dr of a bag b. This method is particularly effective when a bag b to be taken out next (that is, a bag b at the uppermost position) is positioned at the leading position on the conveyance direction Dc side of a bag bundle 80, and makes it possible to accurately arrange each take-out holding body 42 in a position which enables to appropriately hold a bag b to be taken out next.

Alternatively, the bag position detection sensor 67 may acquire a captured image of a bag b to be taken out next (that is, a bag b at the uppermost position in the take-out position Pb2), and the control device 15 may analyze the captured image to obtain the absolute position of the bag b to be taken out next. In this case, the control device 15 may cause the take-out unit 13 (in particular, each take-out holding body 42) move to a position corresponding to the obtained absolute position of the bag b, so that the take-out unit 13 is placed in the take-out start position Pt2.

The bag bundle conveyance apparatus 10 can repeat the above-mentioned series of processes to sequentially convey a plurality of bag bundles 80 from the preparation position Pb1 to the take-out position Pb2 and carry individual bags b from the take-out position Pb2 to a subsequent stage.

As described above, according to the above bag bundle conveyance apparatus 10, a bag bundle 80 is placed on the conveyance belt 20 and is stably conveyed in the conveyance direction Dc while the holding unit 30 maintains the entire overlapping state of the plurality of bags b. Therefore, the above-mentioned bag bundle conveyance apparatus 10 is advantageous in conveying a bag bundle 80 while suppressing the posture of the bag bundle 80 from collapsing and preventing each bag b from bending.

Various modifications may be added to each element of the above-described embodiments and variant examples. Further, the configurations of the above-described embodiments and variant examples may be combined in whole or in part.

For example, the posture, orientation, stacking manner, and other states of bags b of a bag bundle 80 are not limited. For example, in a state where a bag bundle 80 is placed on the conveyance belt 20, a bag b at the uppermost position may be arranged at the leading position in the conveyance direction Dc as shown in FIG. 9, or a bag b at the uppermost position may be arranged at the rearmost position in the conveyance direction Dc as shown in FIG. 1. Further, in a state where a bag bundle 80 is arranged on the conveyance belt 20, the thick portion 86 of each bag b may be positioned on the conveyance direction Dc side or may be positioned on the retracting direction Dr side, compared to the position gripped by the gripping unit (that is, the first holding member 51 and the movable bag bundle holding body 60).

In the above-described embodiment, when a bag bundle 80 is conveyed, the conveyance belt 20 moves together with the holding unit 30, but the holding unit 30 may be moved while the conveyance belt 20 is stopped. Specifically, the transfer drive device 32 may move the holding unit 30 in the conveyance direction Dc in a state where a bag bundle 80 is supported from below by the conveyance belt 20 (i.e., a support body) and held by the holding unit 30 (i.e., a holding device) in such a manner that the bag bundle 80 is transported in the conveyance direction Dc. In this case, the bag bundle 80 is conveyed while sliding on the conveyance belt 20 in a state of being supported from below by the conveyance belt 20 (i.e., a support body) and held by the holding unit 30 (i.e., a holding device). Therefore, a bag bundle 80 is advantageously conveyed while the posture of the bag bundle 80 is suppressed from collapsing and each bag b is prevented from bending.

The invention claimed is:

1. A bag bundle conveyance apparatus configured to convey a bag bundle including a plurality of bags, the bag bundle conveyance apparatus comprising:

a support body configured to support the bag bundle from below;

a holding unit configured to hold the bag bundle from above and below; and a transfer drive unit configured to move the holding unit in a horizontal, conveyance direction, wherein the transfer drive unit is configured to move the holding unit in the horizontal, conveyance direction in a state where 1) the plurality of bags of the bag bundle supported from below by the support body are displaced in the conveyance direction in such a manner that each of the plurality of bags partially overlaps with an adjacent bag in a vertical direction that is perpendicular to the conveyance direction and 2) the bag bundle is held by the holding unit from above and below in such a manner that the bag bundle is conveyed in the conveyance direction.

2. The bag bundle conveyance apparatus as defined in claim 1, wherein the support body is configured to support the bag bundle from below while exposing a part of a lower surface of the bag bundle, and wherein the holding unit is configured to nip and hold the bag bundle while being configured to be in contact with the part of the lower surface of the bag bundle exposed from the support body.

3. The bag bundle conveyance apparatus as defined in claim 1, wherein the plurality of bags of the bag bundle supported by the support body is displaced in the conveyance direction in such a manner that each of the plurality of bags partially overlaps with an adjacent bag, wherein the support body has an extension space extending in the conveyance direction, and wherein the holding unit is configured to travel through the extension space while conveying the bag bundle in the conveyance direction.

4. The bag bundle conveyance apparatus as defined in claim 2, wherein the plurality of bags of the bag bundle supported by the support body is displaced in the conveyance direction in such a manner that each of the plurality of bags partially overlaps with an adjacent bag, wherein the support body has an extension space extending in the conveyance direction, and wherein the holding unit is configured to travel through the extension space while conveying the bag bundle in the conveyance direction.

5. The bag bundle conveyance apparatus as defined in claim 1, comprising a conveyance drive unit configured to cause the support body to move in the conveyance direction, wherein the conveyance drive unit and the transfer drive unit are configured to move the support body and the holding unit together in the conveyance direction in a state where the bag bundle is supported by the support body from below and held by the holding unit, in such a manner that the bag bundle is conveyed in the conveyance direction.

6. The bag bundle conveyance apparatus as defined in claim 2, comprising a conveyance drive unit configured to cause the support body to move in the conveyance direction, wherein the conveyance drive unit and the transfer drive unit are configured to move the support body and the holding unit together in the conveyance direction in a state where the bag bundle is supported by the support body from below and held by the holding unit, in such a manner that the bag bundle is conveyed in the conveyance direction.

7. The bag bundle conveyance apparatus as defined in claim 3, comprising a conveyance drive unit configured to cause the support body to move in the conveyance direction, wherein the conveyance drive unit and the transfer drive unit are configured to move the support body and the holding unit together in the conveyance direction in a state where the bag bundle is supported by the support body from below and held by the holding unit, in such a manner that the bag bundle is conveyed in the conveyance direction.

8. The bag bundle conveyance apparatus as defined in claim 4, comprising a conveyance drive unit configured to cause the support body to move in the conveyance direction, wherein the conveyance drive unit and the transfer drive unit are configured to move the support body and the holding unit together in the conveyance direction in a state where the bag bundle is supported by the support body from below and held by the holding unit, in such a manner that the bag bundle is conveyed in the conveyance direction.

9. The bag bundle conveyance apparatus as defined in claim 5, wherein the support body includes a conveyance belt, wherein the bag bundle is supported from below by being placed on the conveyance belt, and wherein the conveyance drive unit is configured to cause the conveyance belt to travel in the conveyance direction.

10. The bag bundle conveyance apparatus as defined in claim 6, wherein the support body includes a conveyance belt, wherein the bag bundle is supported from below by being placed on the conveyance belt, and wherein the conveyance drive unit is configured to cause the conveyance belt to travel in the conveyance direction.

11. The bag bundle conveyance apparatus as defined in claim 7, wherein the support body includes a conveyance belt, wherein the bag bundle is supported from below by being placed on the conveyance belt, and wherein the conveyance drive unit is configured to cause the conveyance belt to travel in the conveyance direction.

12. The bag bundle conveyance apparatus as defined in claim 8, wherein the support body includes a conveyance belt, wherein the bag bundle is supported from below by being placed on the conveyance belt, and wherein the conveyance drive unit is configured to cause the conveyance belt to travel in the conveyance direction.

13. The bag bundle conveyance apparatus as defined in claim 7, wherein the support body includes a plurality of conveyance belts, wherein the bag bundle is supported from below by being placed on the plurality of conveyance belts, wherein the conveyance drive unit is configured to cause the plurality of conveyance belts to travel in the conveyance direction, wherein the extension space is configured to be provided between two conveyance belts positioned adjacently of the plurality of conveyance belts.

14. The bag bundle conveyance apparatus as defined in claim 8, wherein the support body includes a plurality of conveyance belts, wherein the bag bundle is supported from below by being placed on the plurality of conveyance belts, wherein the conveyance drive unit is configured to cause the plurality of conveyance belts to travel in the conveyance direction, wherein the extension space is configured to be provided between two conveyance belts positioned adjacently of the plurality of conveyance belts.

15. The bag bundle conveyance apparatus as defined in claim 11, wherein the support body includes a plurality of conveyance belts, wherein the bag bundle is supported from below by being placed on the plurality of conveyance belts, wherein the conveyance drive unit is configured to cause the plurality of conveyance belts to travel in the conveyance direction, wherein the extension space is configured to be provided between two conveyance belts positioned adjacently of the plurality of conveyance belts.

16. The bag bundle conveyance apparatus as defined in claim 12, wherein the support body includes a plurality of conveyance belts, wherein the bag bundle is supported from below by being placed on the plurality of conveyance belts, wherein the conveyance drive unit is configured to cause the plurality of conveyance belts to travel in the conveyance direction, wherein the extension space is configured to be provided between two conveyance belts positioned adjacently of the plurality of conveyance belts.

17. The bag bundle conveyance apparatus as defined in claim 1, wherein each of the plurality of bags includes a thick portion that has a locally larger thickness in each of the plurality of bags, and wherein the bag bundle is supported by the support body in a state where the thick portion of at least one of the plurality of bags is in contact with the support body.

18. A bag bundle conveyance method configured to convey a bag bundle including a plurality of bags, the bag bundle conveyance method comprising the steps of:

causing a support body to support the bag bundle from below;

causing a holding unit to hold the bag bundle from above and below; and causing the holding unit to move in a horizontal, conveyance direction in a state where 1) the plurality of bags of the bag bundle supported from below by the support body are displaced in the conveyance direction in such a manner that each of the plurality of bags partially overlaps with an adjacent bag in a vertical direction that is perpendicular to the conveyance direction and 2) the bag bundle is held by the holding unit from above and below in such a manner that the bag bundle is conveyed in the conveyance direction.

* * * * *